UNITED STATES PATENT OFFICE.

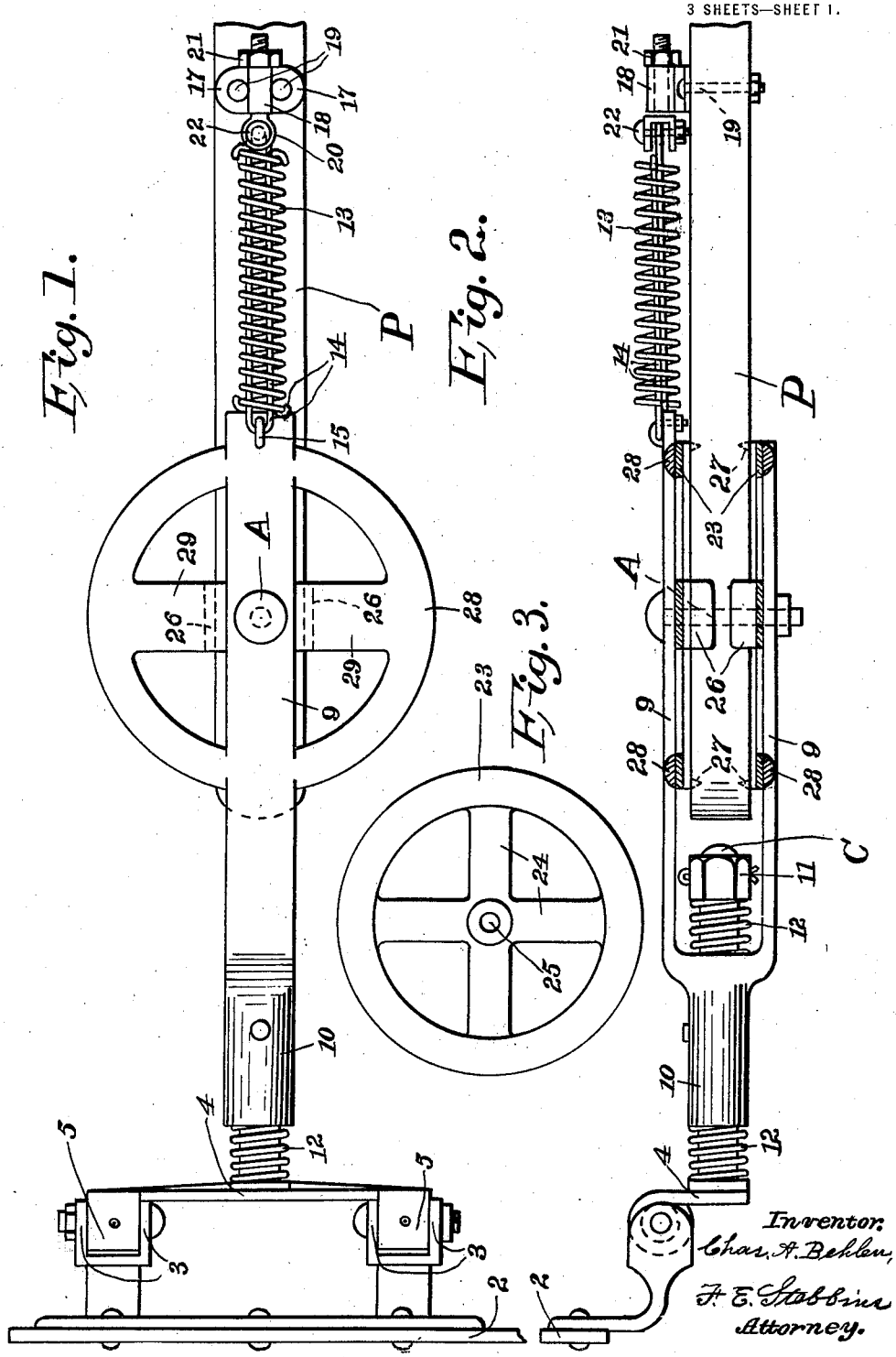

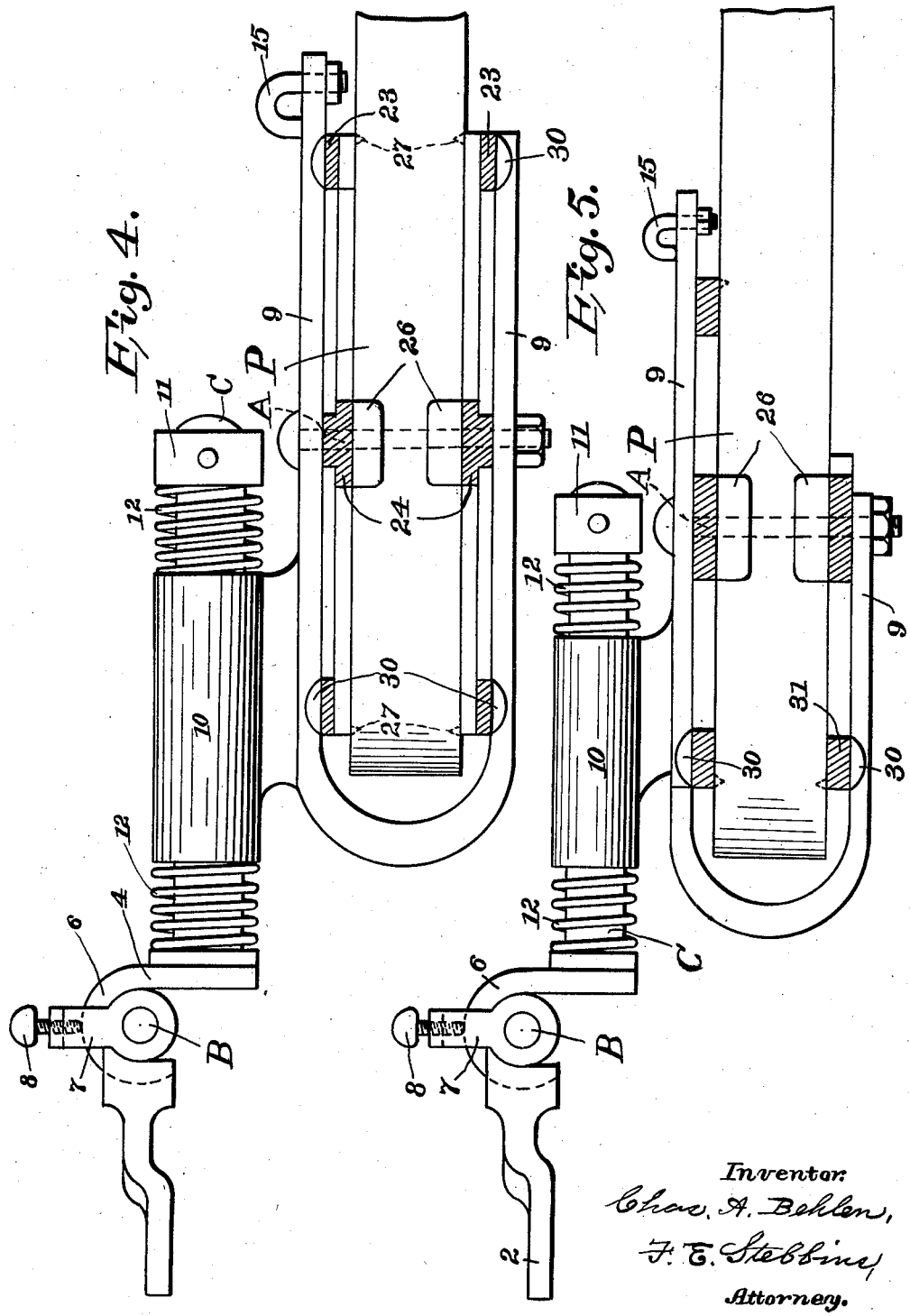

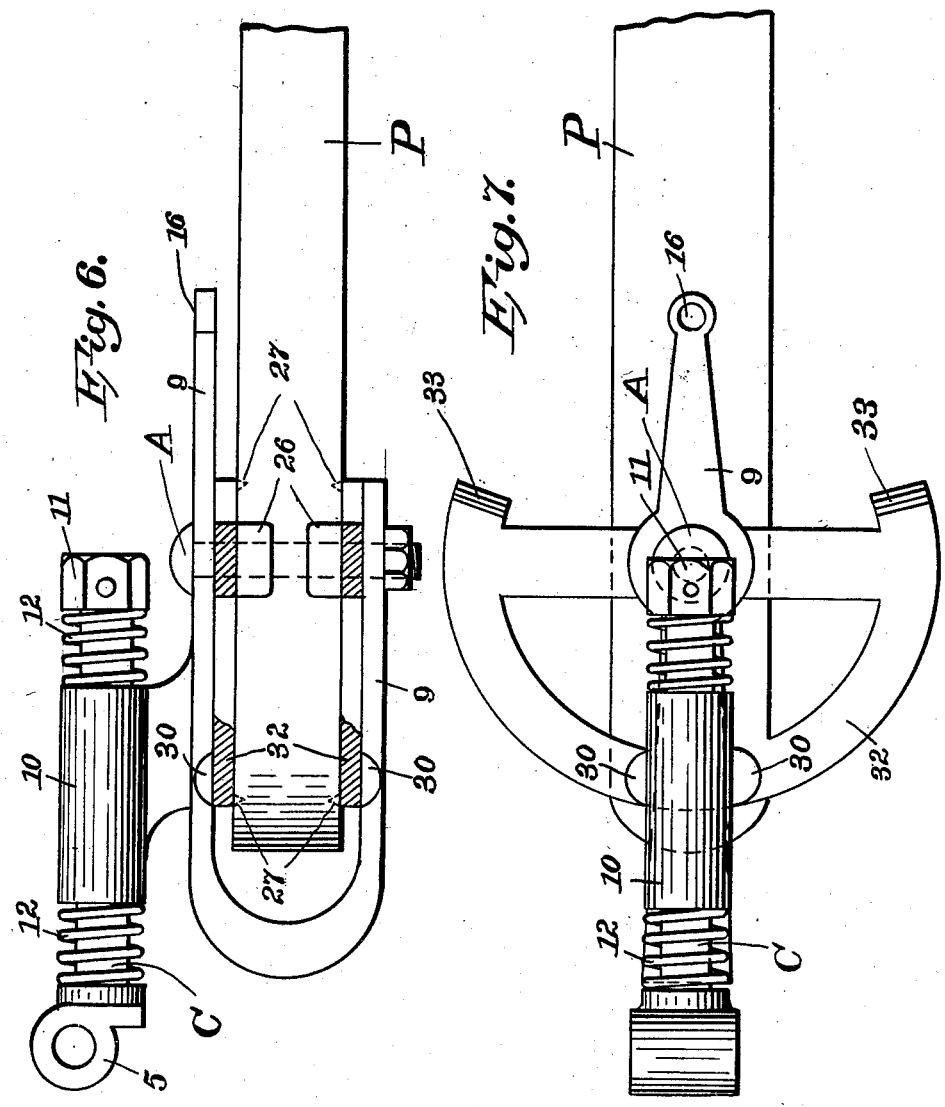

CHARLES A. BEHLEN, OF CINCINNATI, OHIO.

COUPLING AND DRAW-BAR FOR TRAILERS.

1,313,453.     Specification of Letters Patent.     Patented Aug. 19, 1919.

Application filed May 17, 1919. Serial No. 297,823.

*To all whom it may concern:*

Be it known that I, CHARLES A. BEHLEN, a citizen of the United States, residing at Cincinnati, in the county of Hamilton and State of Ohio, have invented certain new and useful Improvements in Couplings and Draw-Bars for Trailers; and I do hereby declare the following to be a full, clear, and exact description of the invention, such as will enable others skilled in the art to which it appertains to make and use the same.

The object of the invention is the production of improved means for attaching or connecting a trailer to a power vehicle, such as a truck or automobile. In traversing ordinary roads provision should be made for allowing each of the vehicles to move in three directions relative to the other, to wit: a vertical movement about a horizontal axis; a horizontal movement about a vertical axis; and a rocking motion about a horizontal axis in the line of draft.

My invention consists in a coupling and drawbar having certain novelties of construction, and, further, in the combined parts whereby the above mentioned movements are made possible.

The accompanying drawings illustrate four examples of the embodiment of the invention which disclose the best modes of procedure I have so far devised for applying the principles.

Figure 1 is a top plan view of the first example.

Fig. 2 is a side view in elevation of Fig. 1.

Fig. 3 is a top plan view of one of the two circular fixed fifth wheel or bearing members of this example.

Fig. 4 is a side view of the second example having fixed upper and lower full circle fifth wheels or bearing members.

Fig. 5 is a side view of the third example having a fixed top full circle fifth wheel or bearing member, and a fixed semicircular lower bearing member.

Fig. 6 is a side view in elevation of the fourth example having fixed semicircular top and bottom bearing members.

Fig. 7 is a top plan view of Fig. 6.

In each of the examples P designates a pole or other part of a trailer to which the coupling and drawbar device is pivotally attached, said pole having a hole to receive a vertical bolt; A, a vertical bolt allowing horizontal movement of one vehicle relative to the other, the same constituting an axis or pivot; B, the horizontal bolts allowing vertical movements of the vehicles relative to each other; and C the drawbar, preferably circular in cross section, allowing rocking movements of each vehicle relative to the other.

The coupling comprises two parts pivotally united by two bolts B, B or a single bolt B, as desired, one part comprising a plate or casting 2 adapted to be secured to the power vehicle, and having perforated ears 3, 3, and the other part comprising the drawbar C provided with a head 4 and a perforated loop or loops 5, the loop or loops being located between ears 3, 3 and the bolt or bolts B passed through the perforations in the loops and ears, thus forming the horizontal axis or pivot, permitting vertical movements of the two vehicles one relative to the other.

In Figs. 4 and 5 I have shown a hook 6 which is the equivalent of a loop, also a yoke and set-screw 7, 8 not specifically claimed in this application.

The drawbar C is pivotally connected to the vertical bolt A through the medium of a so-called fifth wheel device comprising a clevis of a U shape having parallel arms 9, 9 perforated to receive the bolt A about which the device turns as a center, and a longitudinally perforated head 10, within which the drawbar is loosely located, a threaded nut 11 on the drawbar preventing its withdrawal in service. At each end of the head and surrounding the drawbar are coiled springs 12, 12, one a draw spring and the other a buffing spring, bearing against the nut and the head 4, as shown.

In the first example the perforated head 10 is between the arms 9, 9 and extended therefrom and parallel with the arms, in the other examples the head 10 is attached to one of the arms, the top one preferably, and parallel therewith and the same may be formed integral with said arms or arm or made separate and attached.

To the end of one of the arms and take up anchoring means on the pole is a spring 13 for returning the clevis and drawbar to a position parallel with the pole when the power vehicle passes from a curved path to a tangent, and also to restrain free rotary motion of the clevis and drawbar about the bolt A.

The spring may be of any suitable construction. I show a coil spring with two oppositely disposed U-shaped hooked rods 14, 14 within it, the hooks engaging opposite ends of the spring and the U part projecting for attachment. An eye bolt 15 in the first three examples and a hole 16 in the fourth example at the end of the top arm receive the U end of one of the U rods 14, as shown. An anchoring casting having ears 17 and a perforated lug 18 are secured to the pole by bolts 19. A threaded perforated eye bolt 20 and nut 21 the shank of the eye bolt being located in the perforation of the lug are connected to the U-shaped end of the other hooked rod within the spring through the medium of the bolt 22. Between the arms 9, 9 and the pole are located bearing and guiding elements which in each of the examples differ slightly in construction and arrangement.

In Figs. 1 and 2 two full circle members top and bottom are attached to the pole. See Fig. 3 for top or outer plan view. 23 is the circle and 24 the crossbars with a bearing 25 and a hole for the king bolt at the center. To anchor the two members to the pole extended lugs 26 engaging the side surfaces of the pole and spurs 27 seated in the wood of the pole are provided.

Complemental full circle members 28 are made integral with the arms 9, 9, or secured thereto, the crossbars 29 uniting the outer portions of the circle to the arms 9, 9, for the purpose of securing rigidity.

In Fig. 4 the two, top and bottom, full circle members are present, like Fig. 3, and likewise fixed to the pole. The arms 9, 9 in this example are relatively of great thickness and preferably have extended bearings 30, as shown in top plan view, Fig. 7.

Fig. 5 is like Fig. 4 except that a semicircular member 31 is substituted for the full circular member at the bottom surface of the pole.

In Figs. 6 and 7 two semicircular bearings 32, top and bottom, are substituted for the full circle members and the arms 9, 9 are provided with the side bearings 30 to increase the frictional wearing surfaces. The ends of the top semicircular bearing may be provided with upwardly projecting lugs 33 to limit the movement of the top arm on a curve.

All of the examples are substantially the same, differing slightly in construction and arrangement; each provides for the free movements of one vehicle relative to the other, as hereinbefore set forth; and each constitutes a simple and effective means for the connection of a power vehicle and trailer.

What I claim is:

1. The combination in a coupling and drawbar device, of a clevis having parallel perforated arms and a perforated head; and a drawbar loosely located within the perforation of said head; said head being located outside the arms parallel therewith and having a perforation constituting a bearing surface for the drawbar sufficiently long to hold the drawbar parallel with the arms.

2. The combination in a coupling and drawbar device, of a clevis having parallel perforated arms and a perforated head located outside and in connection with one arm only; and a drawbar loosely located within the perforation of the head and at one side of the parallel arms.

3. A clevis for a coupling and drawbar device consisting of two parallel perforated arms united at adjacent ends, and a perforated head in connection with one of the arms and extended parallel with and outside said arms.

4. In a coupling and drawbar, a clevis having parallel perforated arms and a perforated head, a drawbar located within the perforation of the head and provided with means at one end for its attachment, and a spring secured at one end to one of the arms and provided with means at the other end for securing the same to a fixed part of a vehicle.

5. In a coupling and drawbar device, a clevis having parallel perforated arms and a head; a drawbar; a part of a trailer, as a pole; a bolt for pivotally connecting the said arms to the pole; and a bearing for one of the arms of the clevis secured to the pole, said bearing being extended each side of the pole to provide a guiding and wearing surface for an arm when the clevis is in a position at an angle to the pole.

6. In a coupling and drawbar device, a clevis having parallel perforated arms and a head; a drawbar; a part of a trailer, as a pole; a bolt for pivotally connecting the said arms to the pole; and a bearing for one of the arms of the clevis in the shape of an arc of a circle attached to the pole.

7. In a coupling and drawbar device, a clevis having parallel perforated arms and a head; a drawbar; a part of a trailer, as a pole; a bolt for pivotally connecting the said arms to the pole; and top and bottom bearings for the arms of the clevis secured to the top and bottom surfaces of the pole, said bearings being extended outwardly on each side from the pole.

8. In a coupling and drawbar device, a clevis having parallel perforated arms and a head; a drawbar; a part of a trailer, as a pole; a bolt for pivotally connecting the said arms to the pole; and top and bottom bearings for the arms of the clevis each bearing being in the shape of an arc of a circle and adapted to be secured to the pole.

9. In a coupling and drawbar device, a clevis having parallel perforated arms and a head; a drawbar; a part of a trailer, as a pole; a bolt for pivotally connecting the clevis to the pole; and a bearing for one of the arms in the shape of a full circle secured to the pole.

10. In a coupling and drawbar device, a clevis having parallel perforated arms and a head; a drawbar; a part of a trailer, as a pole; a bolt for pivotally connecting the clevis to the pole; and bearings for the arms each in the shape of a full circle secured to opposite surfaces of the pole.

11. In a coupling and drawbar device, a clevis having perforated parallel arms and a head; a drawbar; a part of a trailer, as a pole; a bolt for pivotally connecting the clevis to the pole; a bearing secured to the pole; and a bearing in connection with one of the arms adapted to frictionally engage the bearing on the pole.

12. In a coupling and drawbar device, a clevis having parallel perforated arms and a head; a drawbar; a part of a trailer, as a pole; a bolt for pivotally connecting the clevis to the pole; bearings secured to opposite sides of the pole; and a bearing in connection with each of said arms adapted to frictionally engage one of the bearings on the pole.

13. In a coupling and drawbar device, a clevis having parallel perforated arms and a head; a drawbar; a part of a trailer, as a pole; a bolt for pivotally connecting the clevis to the pole; bearings each in the shape of an arc of a circle secured to opposite sides of the pole; and bearings each in the shape of an arc of a circle in connection with the two arms of the clevis.

14. In a coupling and drawbar device, a clevis having parallel perforated arms; a drawbar in connection with said clevis provided with means for its attachment; a part of a trailer, as a pole; a bolt for pivotally connecting the clevis to the pole; and a spring attached to one arm of the clevis and to a part of the trailer to control the movement of the clevis.

15. The combination in a coupling and drawbar device and with a part of a trailer, of a clevis having parallel perforated arms and a perforated head; a bolt pivotally connecting the arms with a part of a trailer; a drawbar loosely located within the perforation of said head; means for pivotally connecting the drawbar to a power vehicle; and a spring connected to one arm of the clevis and a part of the trailer.

16. In a coupling and drawbar device, a clevis having parallel perforated arms and a perforated head, a drawbar loosely located within the perforation of said head, and draw and buffer springs located on the drawbar at opposite ends of the perforated head.

17. In a coupling and drawbar device, a clevis having parallel perforated arms, a drawbar supported by said clevis, and spring means secured to one of the arms of the clevis and provided with means for attachment to a fixed part of a vehicle.

In testimony whereof I affix my signature.

CHARLES A. BEHLEN.

Witnesses:
GORDON K. HAERR,
WM. BEISER.

Copies of this patent may be obtained for five cents each, by addressing the "Commissioner of Patents, Washington, D. C."